United States Patent
Bongiovanni et al.

(10) Patent No.: US 10,779,471 B2
(45) Date of Patent: Sep. 22, 2020

(54) TELESCOPIC REEL

(71) Applicant: STW S.R.L., Cuneo (IT)

(72) Inventors: Livio Bongiovanni, Cuneo (IT); Lodovico Armando, Cervasca (IT)

(73) Assignee: STW S.R.L., Cuneo (IT)

( * ) Notice: Subject to any disclaimer, the term of this patent is extended or adjusted under 35 U.S.C. 154(b) by 181 days.

(21) Appl. No.: 15/735,126

(22) PCT Filed: Jun. 9, 2016

(86) PCT No.: PCT/IB2016/053409
§ 371 (c)(1),
(2) Date: Dec. 8, 2017

(87) PCT Pub. No.: WO2016/199068
PCT Pub. Date: Dec. 15, 2016

(65) Prior Publication Data
US 2020/0029501 A1    Jan. 30, 2020

(30) Foreign Application Priority Data

Jun. 11, 2015    (IT) .................. 102015000022912

(51) Int. Cl.
*A01D 41/14* (2006.01)
*A01D 57/02* (2006.01)
(Continued)

(52) U.S. Cl.
CPC .......... *A01D 41/148* (2013.01); *A01D 57/02* (2013.01); *A01D 57/12* (2013.01); *A01D 80/02* (2013.01)

(58) Field of Classification Search
CPC ...... A01D 57/02; A01D 41/148; A01D 57/04; A01D 80/02; A01D 57/12
See application file for complete search history.

(56) References Cited

U.S. PATENT DOCUMENTS 3,258,901 A    7/1966    Van Der Lely et al.
3,555,796 A    1/1971    Baumeister
(Continued)

FOREIGN PATENT DOCUMENTS

CN    101933430 A    1/2011
CN    104126373 A    11/2014
(Continued)

OTHER PUBLICATIONS

International Preliminary Report on Patentability dated Dec. 12, 2017, issued in PCT Application No. PCT/IB2016/053409, filed Jun. 9, 2016.
(Continued)

*Primary Examiner* — Arpad Fabian-Kovacs
(74) *Attorney, Agent, or Firm* — Workman Nydegger (57) ABSTRACT

A telescopic reel for an agricultural machine includes at least one side module being telescopic relative to a central module for causing the reel to switch from a retracted position to an extended position. A second crosspiece of the side module is adapted to enter into a cavity of a first crosspiece of the central module when the reel is in the retracted position, and is adapted to be extended when the reel is in the extended position. The first crosspiece and the second crosspiece are provided with a crop lifting system. The lifting system includes a connection for connecting lifts to at least one intersection element of the reel so that the lifts can slide along the second crosspiece of the side module. The lifts are brought close to each other when the reel is in the retracted position and the lifts are positioned relative to each other and to the at least one intersection element, at a distance substantially matching that of connection, when the reel is in the extended position.

20 Claims, 9 Drawing Sheets

(51) Int. Cl.
*A01D 57/12* (2006.01)
*A01D 80/02* (2006.01)

(56) References Cited

U.S. PATENT DOCUMENTS

| | | | |
|---|---|---|---|
| 3,561,198 A | 2/1971 | Herbsthofer | |
| 3,771,299 A * | 11/1973 | Gradwohl | A01D 57/03 56/220 |
| 4,068,454 A * | 1/1978 | Webb | A01D 57/03 56/220 |
| 4,487,004 A * | 12/1984 | Kejr | A01D 41/14 56/14.4 |
| 4,910,946 A | 3/1990 | Underwood | |
| 9,376,261 B1 * | 6/2016 | Miller | E01H 5/076 |
| 2007/0266692 A1 | 11/2007 | Lolley | |
| 2010/0326035 A1 | 12/2010 | Schrattenecker | |
| 2012/0047867 A1 * | 3/2012 | Coers | A01D 57/02 56/220 |
| 2014/0283494 A1 | 9/2014 | Schrattenecker | |
| 2014/0318097 A1 | 10/2014 | Herringshaw et al. | |
| 2018/0177131 A1 * | 6/2018 | Armando | A01D 57/04 |

FOREIGN PATENT DOCUMENTS

| | | |
|---|---|---|
| DE | 1 919 362 U | 7/1965 |
| DE | 7606361 U1 | 11/1976 |
| DE | 10 2011 118 315 A1 | 5/2013 |
| EP | 2 856 855 A1 | 4/2015 |
| NL | 6705524 | 4/1967 |
| SU | 547186 A1 | 2/1977 |

OTHER PUBLICATIONS

International Search Report dated Aug. 31, 2016, issued in PCT Application No. PCT/IB2016/053409, filed Jun. 9, 2016.
Written Opinion dated Aug. 31, 2016, issued in PCT Application No. PCT/IB2016/053409, filed Jun. 9, 2016.
Italian Search Report dated Feb. 18, 2016, issued in Italian Application No. ITUB20151350.

* cited by examiner

TELESCOPIC REEL

BACKGROUND OF THE INVENTION

1. The Field of the Invention

The present invention relates to a telescopic reel, in particular for an agricultural machine, comprising a crop lifting system according to the preamble of claim 1.

2. The Relevant Technology

Furthermore, the invention concerns a related agricultural machine comprising said telescopic reel.

By definition, a reel is that part of the cutting platform of an agricultural machine, in particular a harvesting machine, which is located at the front end thereof. The task of the reel is to accompany, lift from the ground and convey the product, during the harvest, towards the cutting part of the cutting platform for cereals, soy bean, rape, rice and other agricultural products. A reel generally comprises a plurality of crosspieces whereto spring-loaded teeth used for lifting the crop are anchored.

Telescopic reels are known in the field of agricultural machines or agricultural equipment in general; in particular, United States patent document U.S. Pat. No. 3,561,198 discloses a telescopic reel wherein the cross-members making up the reel are inserted into each other to allow the reel to take a retracted position and an extended position. The spring-loaded teeth are only connected to the crosspieces that have a cavity for inserting the other crosspieces of the central module of the reel. The crosspieces of the central module are not equipped with spring-loaded teeth.

Therefore, such a configuration of the reel suffers from the huge defect that the crop is not lifted in the central part, i.e., at the central module, where there are no spring-loaded teeth.

It is therefore apparent that such a reel cannot actually be used for harvesting.

United States patent document U.S. Pat. No. 4,910,946 discloses a reel and a cutting platform of the telescopic type. However, this document provides no suggestions as to the configuration and arrangement of the spring-loaded teeth on the reel.

SUMMARY OF THE INVENTION

It is therefore one object of the present invention to provide a telescopic reel, in particular for an agricultural machine, comprising a crop lifting system, as well as a related agricultural machine, which improve the crop lifting action during the harvest.

A second object of the present invention is to provide a telescopic reel and a related agricultural machine equipped with a crop lifting system, which comprise crop lifting means that allow the reel to be easily opened and closed.

It is a further object of the present invention to provide a telescopic reel and a related agricultural machine which are so designed as to reduce the outer dimensions of the reel in a retracted position thereof.

These and other objects of the invention are achieved through a telescopic reel, in particular for an agricultural machine equipped with a crop lifting system comprising improved crop lifting means, as well as a related agricultural machine, as claimed in the appended claims, which are an integral part of the present description.

In brief, a telescopic reel is described, which is equipped with a crop lifting system comprising crop lifting means that comprise fastening means adapted to fasten connection means for connecting together at least two of said lifting means; said lifting means being adapted to slide along at least one crosspiece of said telescopic reel.

The invention also concerns an agricultural machine comprising said telescopic reel.

BRIEF DESCRIPTION OF THE DRAWINGS

The above objects will become more apparent from the following detailed description of improved crop lifting means for a telescopic reel, of a related crop lifting system for a telescopic reel, and of a telescopic reel according to the present invention, with particular reference to the annexed drawings, wherein.

DETAILED DESCRIPTION OF THE PREFERRED EMBODIMENTS

Figure 1A:
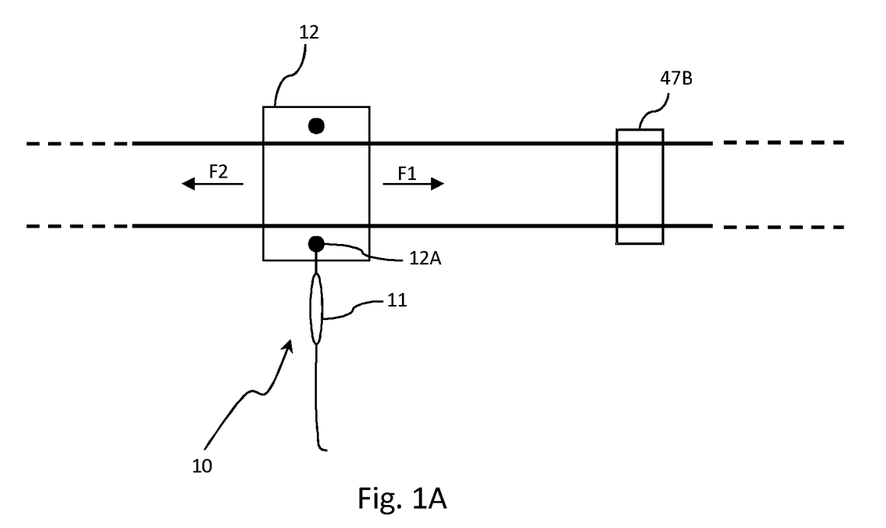
FIGS. 1A and 1B illustrate a first embodiment of crop lifting means according to the present invention.

With reference to FIG. 1A, there is shown a first embodiment of lifting means (designated as a whole by reference numeral 10 in the annexed drawings) of a crop for a telescopic reel (not shown in FIG. 1A, but indicated in FIG. 3 by reference numeral 1) according to the present invention.

In this first embodiment, the lifting means 10 of a crop comprise a tooth 11, in particular a spring-loaded tooth, and a tooth holder 12. The tooth holder 12 comprises coupling means 12A for coupling the tooth 11 at one end thereof; furthermore, the tooth holder 12 is connectable to a crosspiece 47A,47B of said telescopic reel 1. The tooth holder 12 is configured in such a way that it can slide along a longitudinal axis of a crosspiece 47A,47B (see arrows F1 and F2 in FIG. 1A).

Figure 1B:
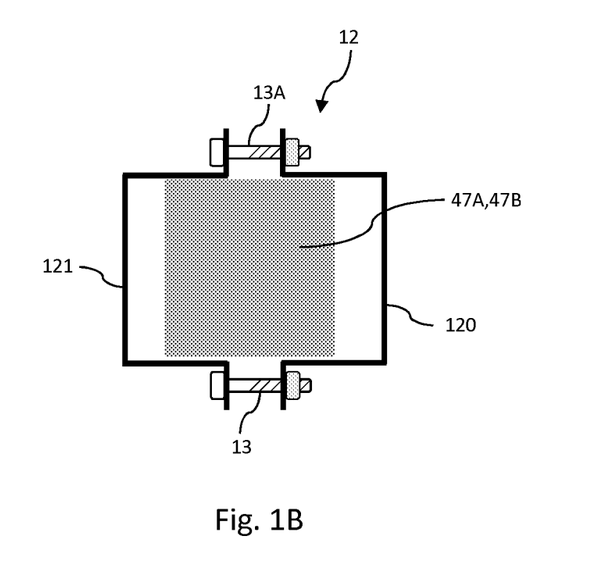

With reference to FIG. 1B, there is shown a preferred embodiment of the tooth holder 12, which comprises two U-shaped elements 120 and 121, in particular made of metallic material, which can be connected together by means of at least one bolt 13 and which are adapted to define a space, or hole, which can receive the crosspiece 47A,47B of the reel 1. In this example, the hole and the crosspiece 47A,47B have a rectangular section. In this embodiment, the tooth holder 12 can slide longitudinally along the crosspiece 47A,47B.

Figure 1C:
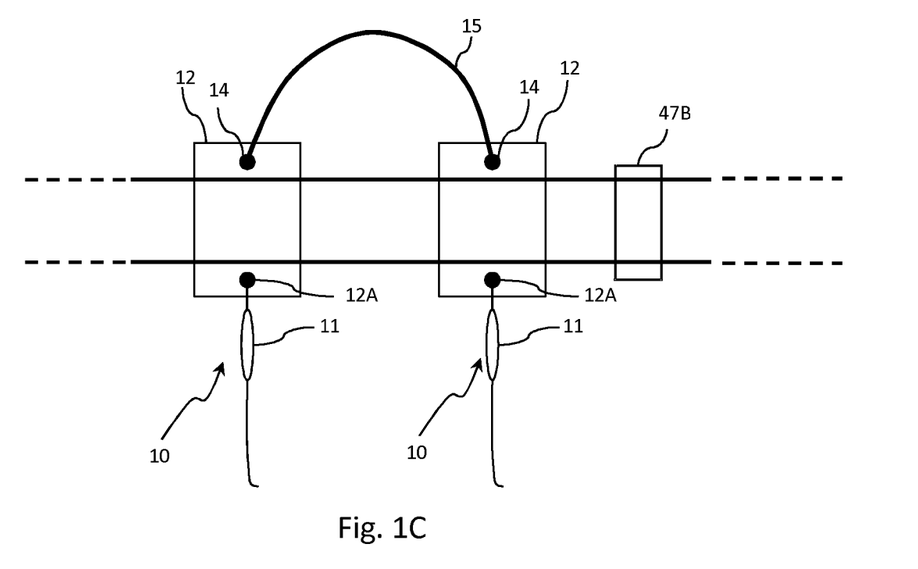
FIG. 1C shows a first embodiment of a crop lifting system according to the present invention.

With reference to FIG. 1C, the tooth holder 12 comprises fastening means 14 adapted to fasten connection means 15 capable of connecting together at least two lifting means 10. More in detail, the fastening means 14 may be the same bolts 13 as used in the preferred embodiment of the tooth holder 12, or other elements such as, for example, a screw, an eyelet formed in the tooth holder 12, a glueing material, etc. It should also be noted that also the coupling means 12A may comprise one of the bolts 13 shown in the embodiment of FIG. 1B.

The connection means 15 preferably comprise at least one steel cable, but may also comprise other elements suitable for the purpose of connecting two or more lifting means 10 of the crop; for example, they may comprise at least one cable of flexible material, one metal cable, one steel cable, one string, one rope, one eyelet of rigid material, one eyelet of flexible material, one chain, one rubber belt, and so on.

It can therefore be easily understood that the fastening means 14 and the connection means 15 may comprise multiple elements suitable for this functional purpose.

The lifting system of the crop according to the present invention comprises the lifting means 10 and the connection means 15.

Figure 2A:
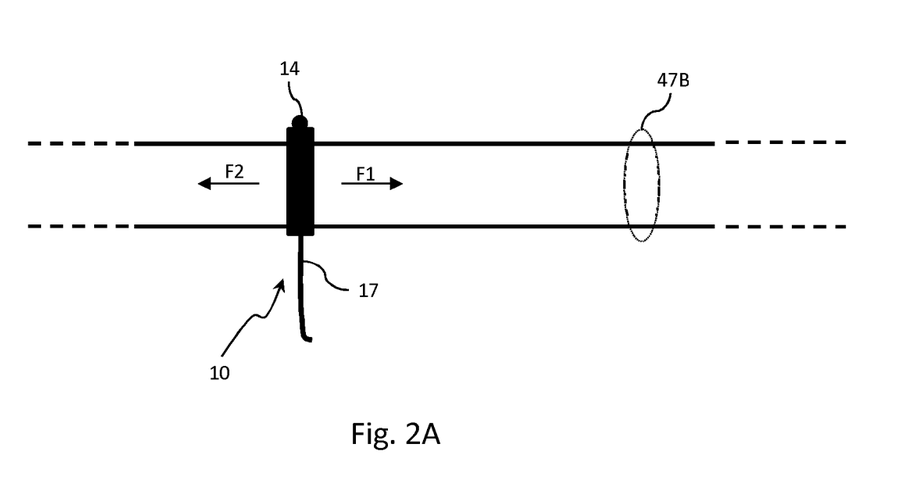
FIGS. 2A and 2B illustrate a second embodiment of crop lifting means according to the present invention.

With reference to FIG. 2A, there is shown a second embodiment of the crop lifting means 10 according to the present invention. More in detail, in the second embodiment the lifting means 10 comprise a single body 17 equipped with a tooth and a hole letting it through the crosspiece 47A,47B of the reel 1. In this case as well, the lifting means 10 comprise fastening means 14 and are adapted to slide along a longitudinal axis of the crosspiece 47A,47B (see arrows F1 and F2 in FIG. 2A), which in this example has an oval cross-section.

Figure 2B:
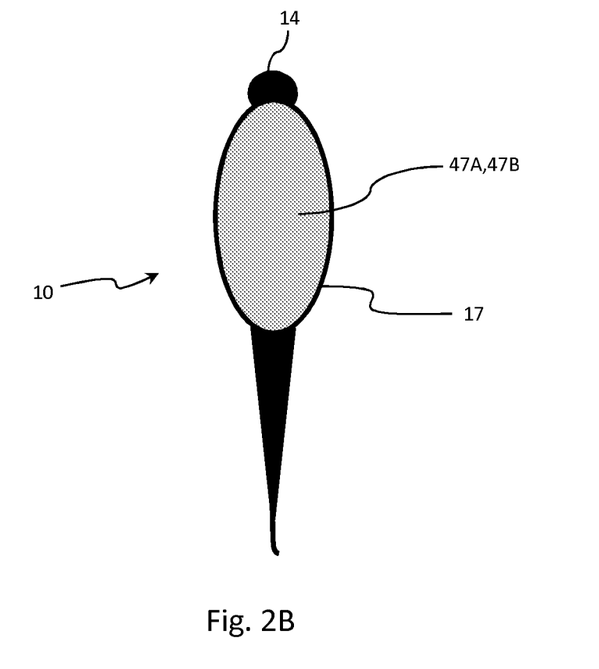

With reference to FIG. 2B, there is shown a side view of the lifting means 10 comprising said single body 17. As clearly shown, the crosspiece 47A,47B enters into the hole of the single body 17 of the lifting means 10; in this example, the hole and the crosspiece 47A,47B have an oval section. Also in this embodiment, the lifting means 10 can easily slide along the crosspiece 47A,47B (see arrows F1 and F2 in FIG. 2A).

In general, the hole of the lifting means 10 which houses the crosspiece 47A,47B may have any shape and size, and the same also applies to said crosspiece 47A,47B.

Figure 2C:
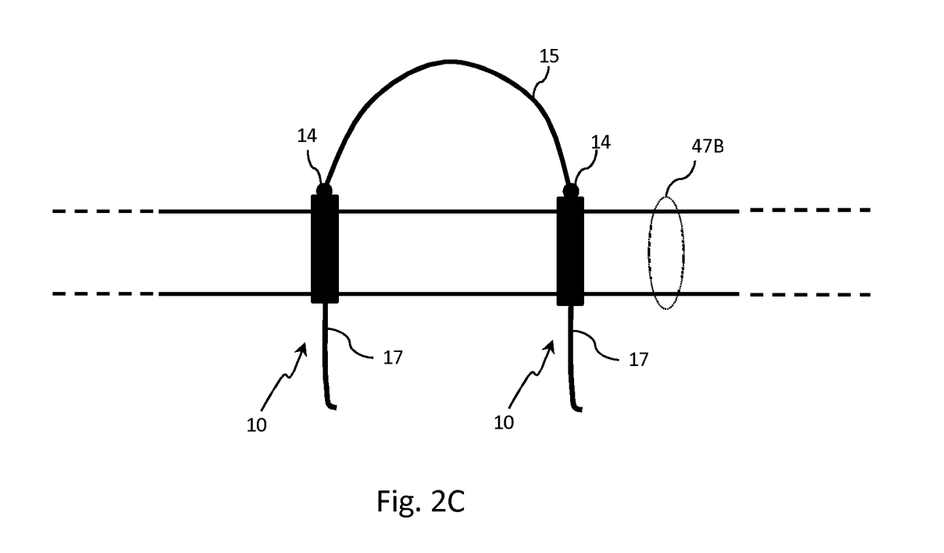
FIG. 2C shows a second embodiment of a crop lifting system according to the present invention.

With reference to FIG. 2C, there is shown the connection between two single bodies 17 of the crop lifting means 10 connected to the fastening means 14 by means of the connection means 15. In other words, a crop lifting system is shown which comprises lifting means 10 and connection means 15; such lifting means 10 are connected together by means of the connection means 15. De facto, the crop lifting system according to the present invention provides an orderly sequence of lifting means 10 arranged on at least one crosspiece 47A,47B of a reel 1 and connected together via the connection means 15.

The same considerations made in the description of the first embodiment (shown in FIGS. 1A to 1C) in regard to the fastening means 14 and the connection means 15 of the lifting means 10 of the crop also apply to this second embodiment (shown in FIGS. 2A to 2C) of the lifting means 10 of the crop.

Figure 3:
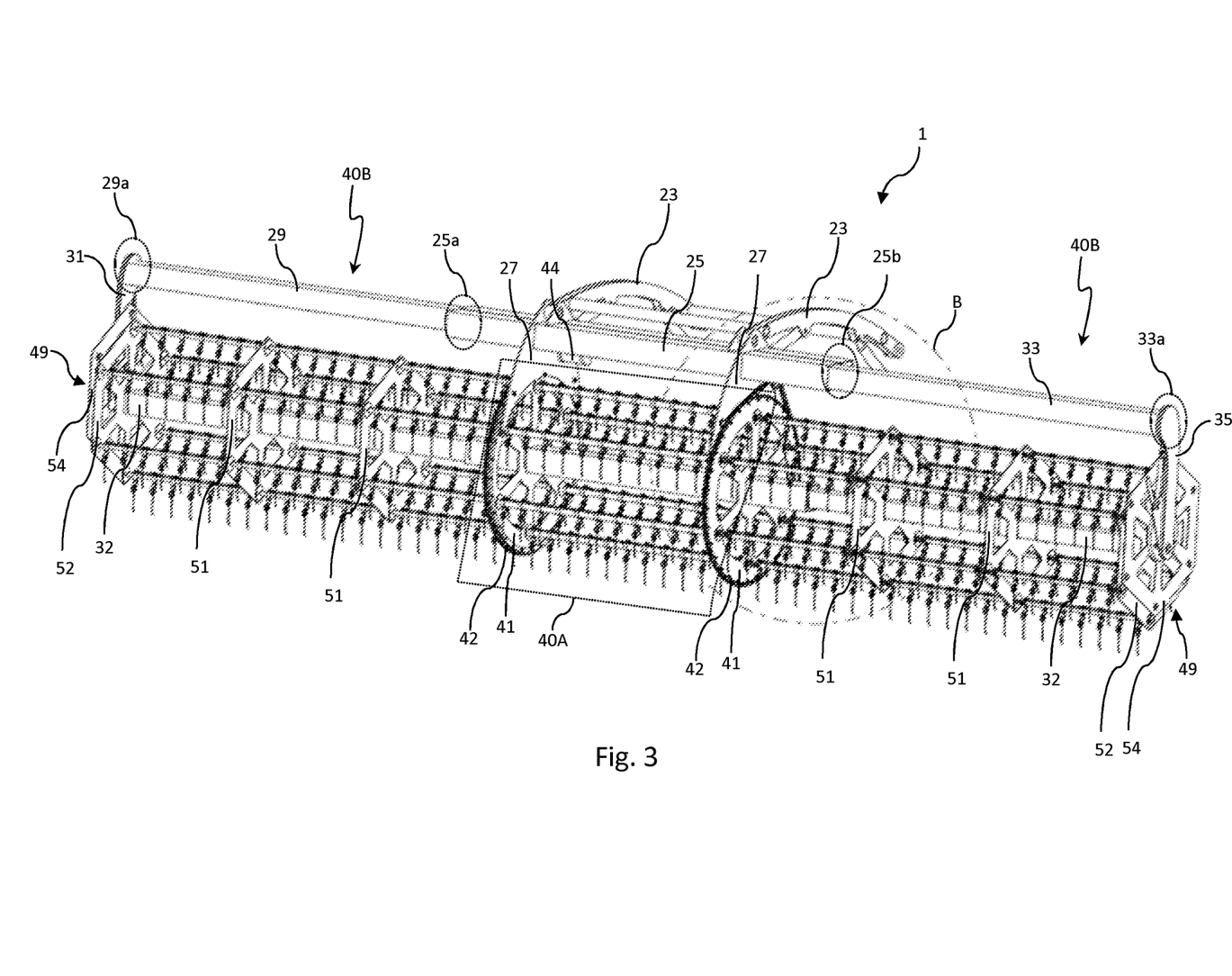
FIG. 3 is a telescopic reel according to the present invention in an open position.

With reference to FIG. 3, there is shown a reel 1 according to the present invention, which comprises the above-described crop lifting system.

The reel 1 is connected to supporting forks 23, preferably consisting of a structure made up of two tubular elements having a parabolic shape, connected to each other near two ends thereof by means of two crosspieces having a cylindrical cross-section. As an alternative, said two crosspieces of the supporting forks 23 may have any cross-section.

Two hubs are welded to one end of the two tubular pieces to allow the reel 1 to be rotated or lifted on pins through the use of two hydraulic cylinders. The supporting forks 23, unlike the conventional solutions known in the art, are connectable in the central part of the reel 1. It must be pointed out that the supporting forks 23 do not belong to the reel 1, but can be connected thereto; in particular, the supporting forks 23 are the means of connection between the reel 1 and an agricultural machine, in particular a harvesting machine (not shown in the annexed drawings).

The reel 1 comprises a telescopic supporting frame 25, which is preferably made up of two tubular elements coupled together by a longitudinal weld along the tubular elements themselves. In the upper part of the telescopic supporting frame 25 there are at least two anchoring brackets, to which the two hubs belonging to the supporting forks 23 can be connected by means of two pins. In the lower part of the telescopic supporting frame 25, at least one bracket 27 is welded, which preferably has a semicircular shape and performs the function of following and supporting, by means of suitable bearings, the rotation of the reel 1.

At a first end 25a of the telescopic supporting frame 25 there is a first telescopic element 29, which preferably consists of a tubular element so sized as to be able to enter and slide in a suitable guide or slider within a portion of the telescopic supporting frame 25.

To a first end 29a of the first telescopic element 29 a first anchoring bracket 31 is connected for supporting a central shaft 32 of the reel 1.

At a second end 25b of the telescopic supporting frame 25 there is a second telescopic element 33, which preferably consists of a tubular element so sized as to be able to enter and slide on a suitable guide or slider within a portion of the telescopic supporting frame 25.

To a first end 33a of the second telescopic element 33 a second anchoring bracket 35 is connected for supporting the central shaft 32 of the reel 21, in particular said second anchoring bracket 35 cooperating with the first anchoring bracket 31 connected to the first end 29a of the first telescopic element 29 for supporting said central shaft 32.

In other words, the reel 1 is symmetrical with respect to its transverse axis of symmetry.

The reel 1 comprises a central module 40A and at least one side module 40B, wherein said at least one side module 40B is telescopic relative to said central module 40A and allows said reel 1 to switch from a retracted or closed position to and extended or open position, and vice versa.

The central module 40A comprises at least one first crosspiece 47A being fixed (i.e., non-telescopic), whereas said at least one side module 40B comprises at least one second crosspiece 47B being telescopic; in particular, said at least one second crosspiece 47B is adapted to enter at least partially into a cavity of said at least one first crosspiece 47A of the central module 40A when the reel 1 is in the retracted or closed position, and is adapted to be extended when the reel 1 is in the extended or open position.

Moreover, said first crosspiece 47A and second crosspiece 47B are provided with a crop lifting system comprising lifting means 10 of said crop according to the teachings of the present invention.

In the embodiment shown in the annexed drawings, said at least one side module 40B comprises a pair of side modules 40B positioned on opposite sides with respect to the central module 40A; in particular, a first side module 40B is associated with the first telescopic element 29 located at the first end 25*a* of the telescopic supporting frame 25, and a second side module 40B is associated with the second telescopic element 33 located at the second end 25*b* of the telescopic supporting frame 25. It is however clear that the provisions of the present invention can also be adopted when the reel 1 is designed to comprise a central module 40A associated with a single side module 40B being telescopic.

Said central module 40A comprises drive means 41, in turn comprising at least one toothed wheel, disk, gear, pulley, or the like. In particular, in the annexed drawings the drive means 41 consist of two toothed wheels 41 and can receive motion, or drive force, through motion transmission means 42 connected thereto, e.g., a chain, a rubber belt, a gear, or the like. The distance between the drive means 41 (preferably consisting of the two toothed wheels 41) may vary according to the dimensions of the reel 1 to be manufactured.

Furthermore, the motion transmission means 42 are connected to a motor 44, which is constrained to the telescopic supporting frame 25. The motor 44 may be electric/electronic, hydraulic, etc.

Figure 4A:
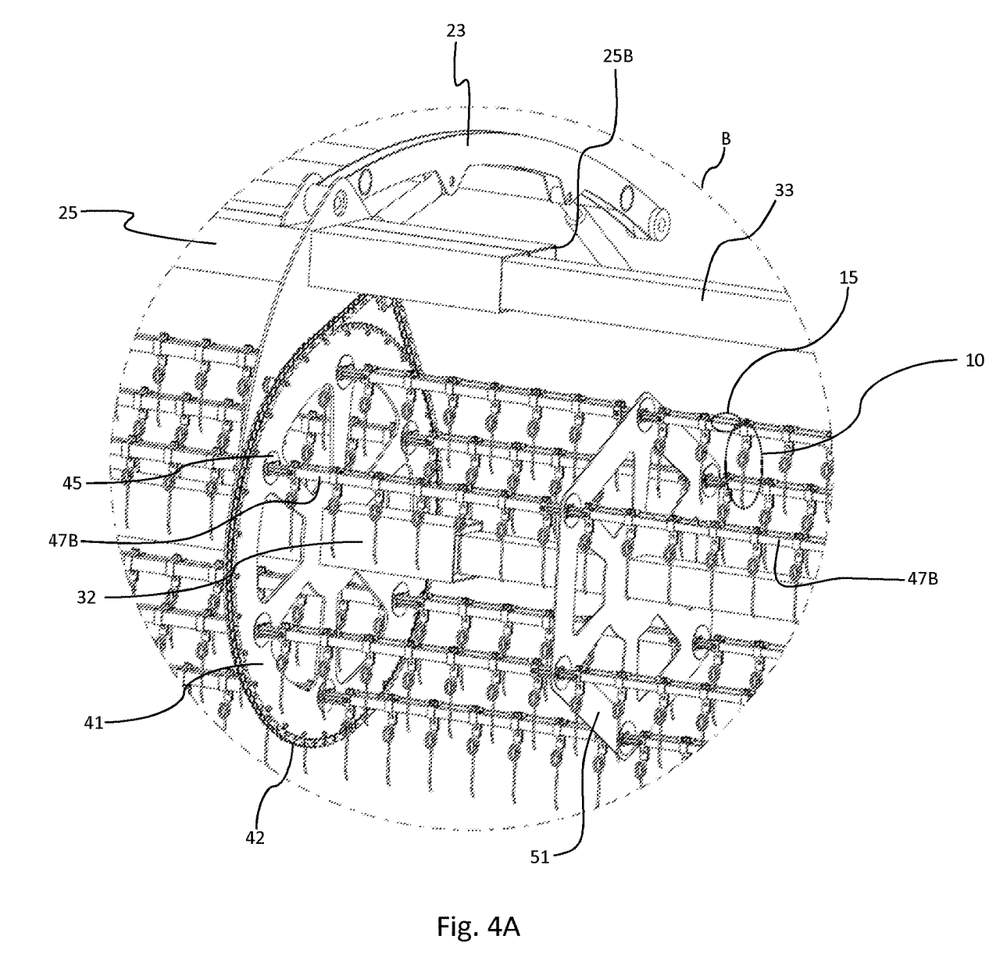
FIG. 4A is an enlarged perspective view of the portion B of the telescopic reel shown in FIG. 3.

With reference to FIG. 4A, there is shown an enlarged view of a portion B of the reel 1 of FIG. 3. The drive means 41 are fastened to the central shaft 32 of the reel 1. The central shaft 32 is telescopic, i.e., it is preferably made up of one or more tubular elements having a cavity into which further tubular elements can be inserted, in particular those belonging to the side modules 40B of the reel 1 (described below). The central shaft 32 is preferably welded to the drive means 41 in a central position thereof.

Figure 4B:
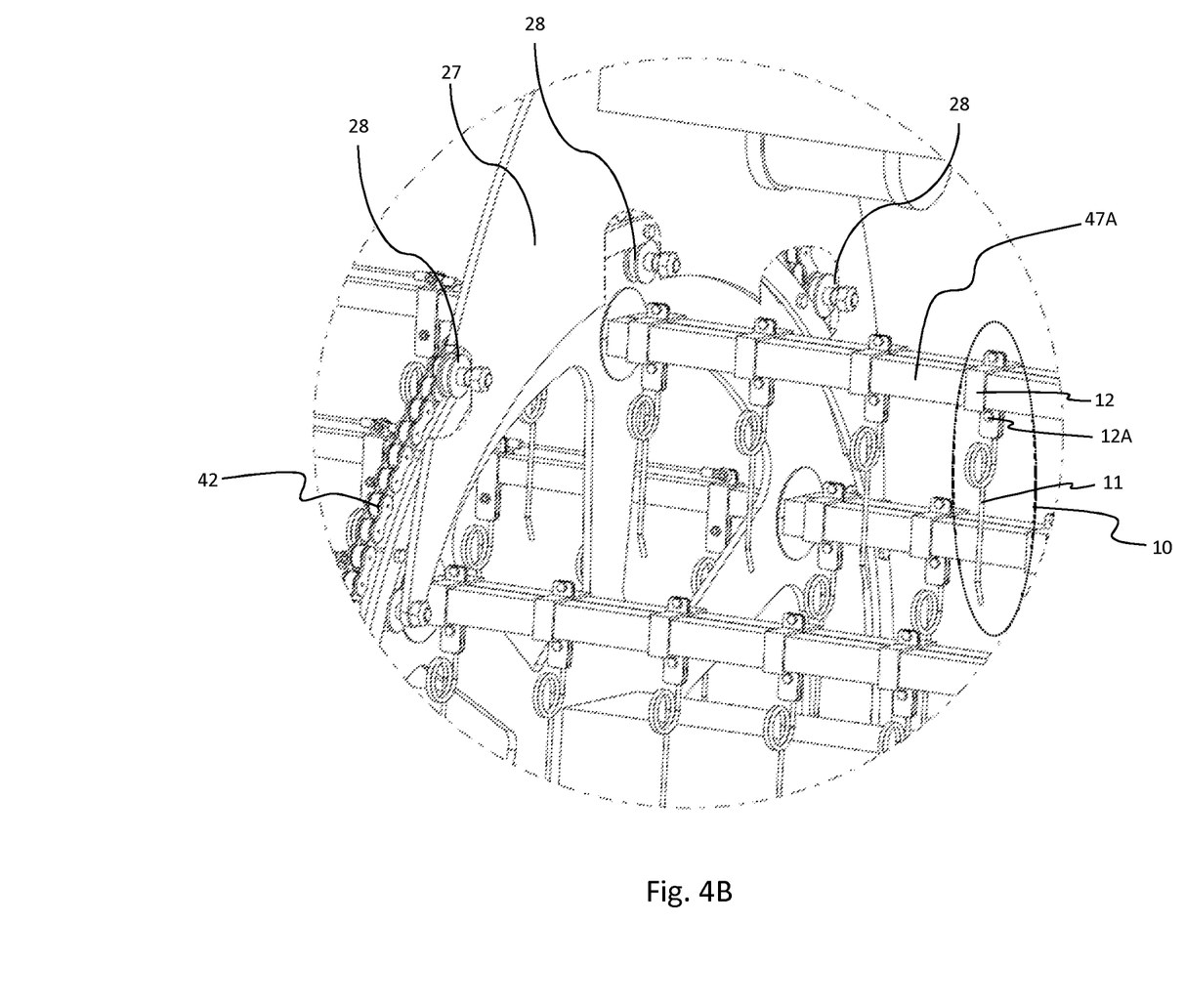
FIG. 4B is an enlarged perspective view of another portion of the telescopic reel shown in FIG. 3.

More in detail, with reference to FIG. 4B, the at least one bracket 27 is connectable to or comprises guiding bearings 28 anchored by means of bolts, which are used for supporting the drive means 41, i.e., for supporting the central module 40A, and hence the whole reel 1.

Figure 4C:
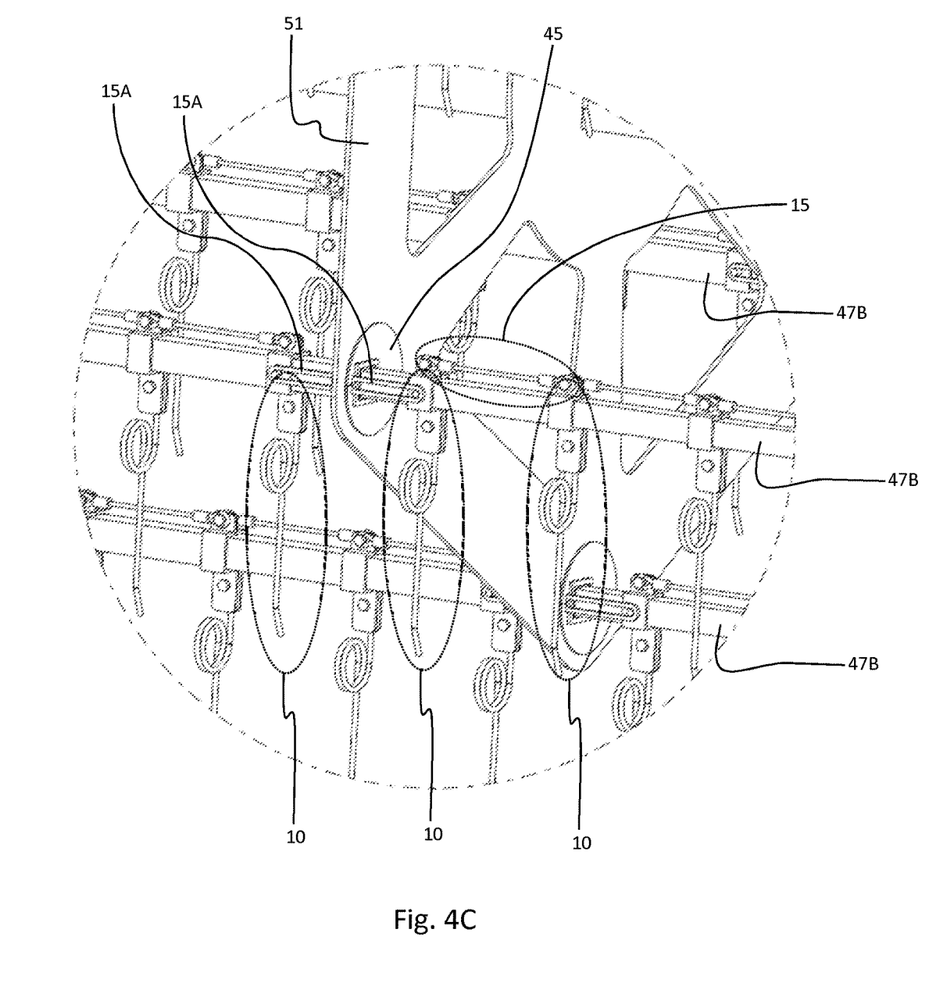
FIG. 4C is an enlarged perspective view of the lifting system of the telescopic reel shown in FIG. 3.

With reference to FIG. 4C, there is shown more in detail the lifting system of the crop comprising the lifting means 10 connected together by the connection means 15. There is also shown one example of the connection means 15, i.e., first slotted dragging blades (indicated in FIG. 4C by reference numeral 15A), provided with a slot in which a pin of the lifting means 10 can slide.

Still with reference to FIG. 4A, in proximity to the perimeter of the drive means 41, bushing supports 45 are fitted for supporting and turning first crosspieces 47A of the central module 40A and second crosspieces 47B of a side module 40B, also called spring-holding twin rods, which are substantially made up of tubular pieces, preferably having a semicircular or square cross-section, that are coupled together in the longitudinal direction by entering one into the other in a telescopic fashion. Said tubular pieces may however have any cross-section.

In particular, FIGS. 3 and 4A show an open position of the reel 1, wherein the telescopic second crosspieces 47B of said at least one side module 40B are totally extended (relative to each other and also relative to the first crosspieces 47A of the central module 40A). The first crosspieces 47A of the central module 40A are, on the contrary, fixed and comprise a cavity for receiving, at least partially, the second crosspieces 47B of the side modules 40B of the reel 1, in particular when the reel 1 is in the retracted, i.e., closed, position (FIGS. 5 and 6); as a result, in said retracted position of the reel 1 the second crosspieces 47B of the side modules 40B are inserted one into the other and are at least partially housed in the first crosspieces 47A of the central module 40A.

Still with reference to FIG. 3, pins are secured, in particular welded by means of centering flanges internal to the tubular elements, to the outer ends 49 of the tubular elements of the side modules 40B, which pins are adapted to enter into bearings arranged on the end of the first telescopic element 29 and second telescopic element 33.

To each one of the outer ends 49 of the tubular elements of the side modules 40B a fixed flange 52, or disk, is secured, which preferably has an hexagonal shape and is provided with seats for fitting said bushing supports 45, in particular in proximity to the corners of the hexagon.

In other words, the reel 1 is telescopic because the second crosspieces 47B of the side modules 40B are adapted to enter at least partially into the first crosspieces 47A of the central module 40A, so as to form a single telescopic body capable of transmitting a homogeneous rotary motion over the entire width of the reel 1. Furthermore, as already mentioned, the central shaft 32 is telescopic as well.

The reel 1 further comprises sliding flanges 51, preferably hexagonal in shape, essentially equidistant in the space comprised between the central module 40A and the outer ends 49 of the reel 1.

Such sliding flanges 51 are characterized in that they can slide along the second crosspieces 47B of the side modules 40B and on the central shaft 32 both in the opening phase of the reel 1, both in the closing phase of the reel 1, while providing a supporting, driving and centering function when the reel is in its operative working phase. Near their respective outer corners, the sliding flanges 51 have coaxial seats for the bushing supports 45.

At the outer ends 49 there are eccentric flanges 54 connected to the anchoring brackets 31,35, and therefore to the telescopic supporting frame 25. Moreover, the eccentric flanges 54 are connected to the fixed flanges 52 by means of a linkage.

In the present description, the drive means 41, the sliding flanges 51 and the fixed flanges 52 are also defined as transversal intersection elements 41,51,52 of the reel 1, in that they are arranged in a substantially transverse manner relative to the longitudinal axis of the reel 1.

The reel 1 according to the present invention comprises the lifting system of the crop according to the present invention, and said lifting system of the crop comprises the lifting means 10 and the connection means 15; said lifting means 10 are connected together by the connection means 15 (see FIG. 4A and, in particular, FIG. 4C).

Figure 5:
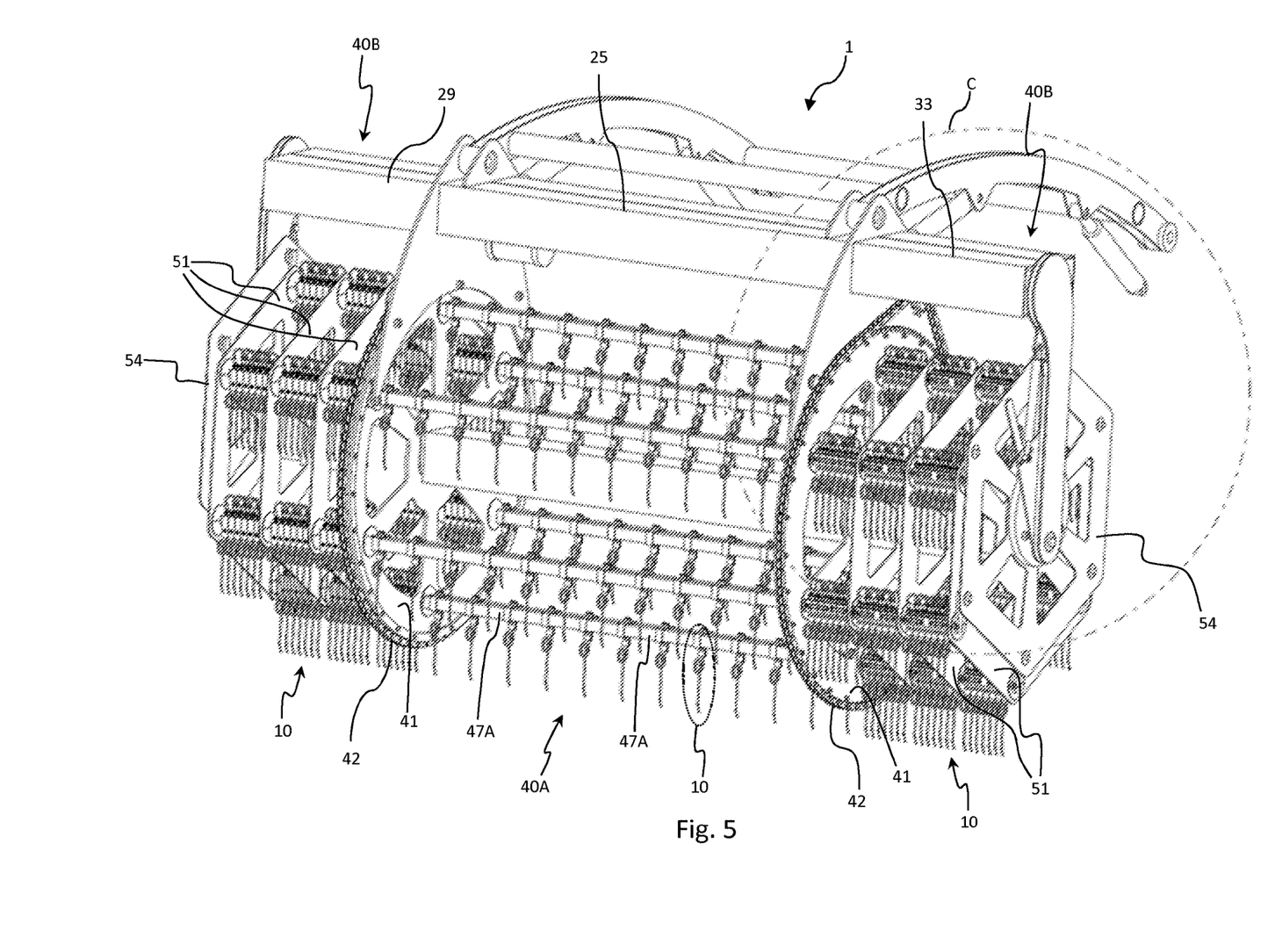
FIG. 5 shows a telescopic reel according to the present invention in a closed position.
Figure 6:
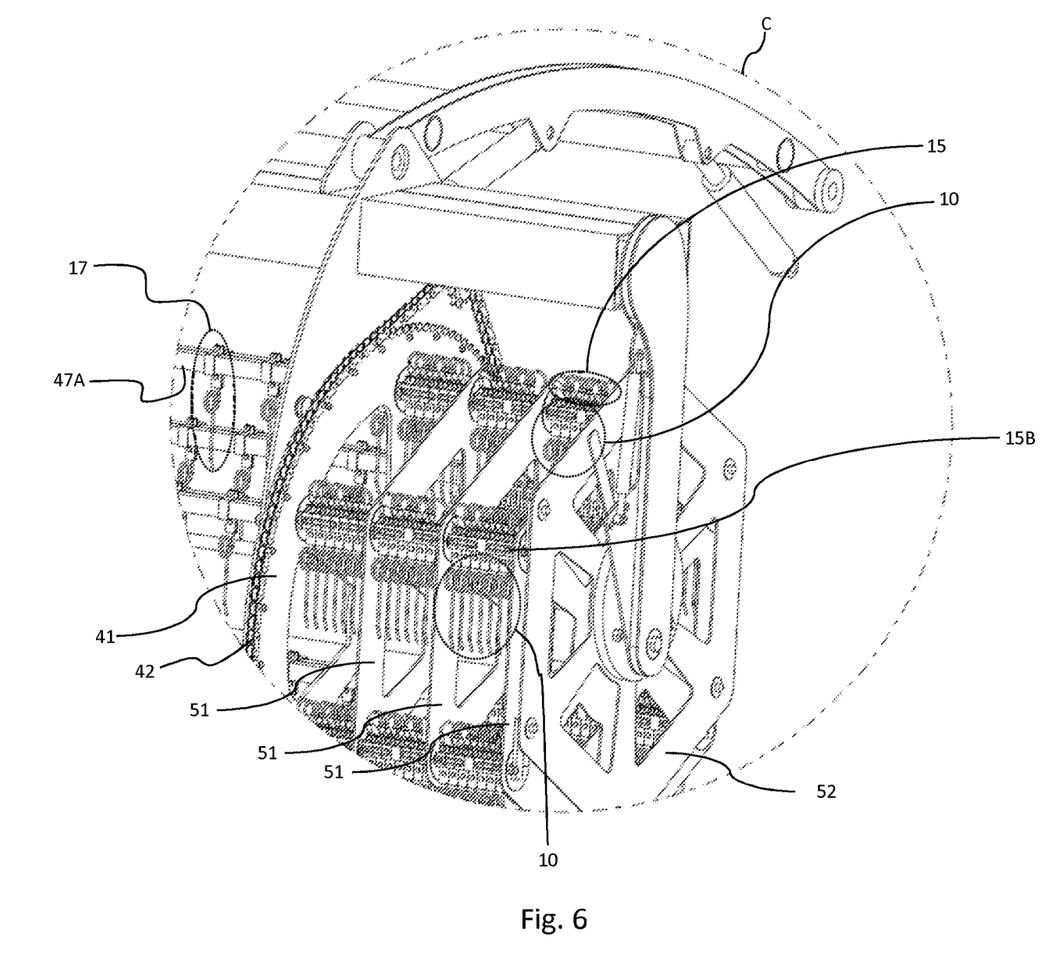
FIG. 6 is an enlarged perspective view of the portion C of the telescopic reel shown in FIG. 5.

Being telescopic, the reel 1 can take an extended or open position (FIGS. 3 and 4A) and a retracted or closed position (FIGS. 5 and 6).

The present invention is characterized in that the lifting means 10 are adapted to come in contact, or almost in contact, with each other when the reel 1 is in a retracted or closed position. On the contrary, the lifting means 10 are adapted to place themselves at a distance essentially corresponding to that of the connection means 15 when the reel 1 is in an extended or open position.

This is possible due to the fact that the lifting means 10 are adapted to slide along the second crosspiece 47B of said at least one side module 40B of the reel 1, and at least one connection means 15 is connected to at least one intersection element 41,51,52.

For example, let us consider a second crosspiece 47B comprised between two sliding flanges 51, including a first lifting means 10, a sequence of the same, and then a last lifting means 10. The lifting means 10 are connected together in succession, from first to last, by the connection means 15, e.g., a steel cable; but the first lifting means 10 in the sequence is also connected to a first sliding flange 51, and the last connection means 15 is also connected to a second sliding flange 51. This connection mechanism can also be implemented for the lifting means 10 residing in the second crosspieces 47B comprised between the drive means 41 and a sliding flange 51 and between a sliding flange 51 and a fixed flange 52.

Alternatively, the connection means 15 may comprise slotted dragging blades.

With reference to FIGS. 5 and 6, there is shown the reel 1, in its entirety and in an enlarged detailed view, in the retracted or closed position. As clearly shown in FIGS. 5 and 6, in the closed position of the reel 1 the lifting means are in contact, or almost in contact, with each other. This occurs when the first telescopic element 29 and the second telescopic element 33 move into the telescopic supporting frame 25, thus bringing the second crosspieces 47B one into the other and at least partially into the first crosspieces 47A. As a consequence, also the lifting means 10 move closer to each other.

FIG. 6 illustrates an enlarged detail C of the reel 1 in the closed position, showing the connection means 15 and the lifting means 10, in particular the flexible steel cables that constitute (in the embodiment of FIG. 6) the connection means 15 and the spring-loaded tooth holders 12 connected to respective spring-loaded teeth 11, which together form one example of the lifting means 10. As can be easily appreciated in the illustrative enlarged detail C, the connection means 15 adopted for connection to at least one intersection element 41,51,52 are second slotted dragging blades 15B, which are, in particular, connected at one end to at least one intersection element 41,51,52, while in the slot a pin slides which is secured to the spring-loaded tooth holder.

It must be pointed out that, when it is totally open, i.e., extended, the telescopic reel 1 according to the present invention has the crop lifting means 10 evenly arranged over the whole length of both the first crosspiece 47A and the second crosspiece 47B whereon they reside. This is very advantageous in terms of harvesting performance.

The features of the present invention, as well as the advantages thereof, are apparent from the above description.

A first advantage of the present invention is that it improves the lifting of the crop during the harvest.

A second advantage of the present invention is that it improves the opening and closing actions of the reel.

A third advantage of the present invention is that it ensures an even crop lifting action.

A further advantage of the present invention is that the outer dimensions of the reel in its retracted position are reduced.

The improved crop lifting means for a telescopic reel and the related crop lifting system for a telescopic reel and telescopic reel according to the present invention may be subject to many possible variations without departing from the novelty spirit of the inventive idea; it is also clear that in the practical implementation of the invention the illustrated details may have different shapes or be replaced with other technically equivalent elements.

It can therefore be easily understood that the present invention is not limited to crop lifting means for a telescopic reel and the related crop lifting system for a telescopic reel and telescopic reel according to the present invention, but may be subject to many modifications, improvements or replacements of equivalent parts and elements without departing from the novelty spirit of the inventive idea, as clearly specified in the following claims.

The invention claimed is:

1. A telescopic reel for an agricultural machine, comprising a central module and at least one side module, said at least one side module being telescopic relative to said central module for causing said reel to switch from a retracted or closed position to an extended or open position, and vice versa, and wherein:
   said central module comprises at least one first crosspiece being fixed,
   said at least one side module comprises at least one second crosspiece, said at least one second crosspiece being telescopically coupled to said at least one first crosspiece by said at least one second crosspiece being slidably received within a cavity of said at least one first crosspiece of said central module,
   said at least one first crosspiece and said at least one second crosspiece each being provided with a crop lifting system comprising lifting means for lifting a crop,
   wherein said crop lifting system of said at least one second crosspiece comprises:
      a plurality of said lifting means for lifting a crop being slidably disposed on said at least one second crosspiece so that said plurality of lifting means are slidable along a length of said second crosspiece when said at least one second crosspiece is advanced into said cavity of said first crosspiece,
      a connector extending between and being coupled to each adjacent pair of said plurality of lifting means, and
      a connector extending between and being coupled to one of said plurality of lifting means and
      at least one intersection element of said reel, whereby said plurality of lifting means:
   are brought toward each other when the reel is in the retracted or closed position, and
   are moved away from each other when the reel is in the extended or open position.

2. The telescopic reel according to claim 1, wherein said at least one intersection element comprises drive means or at least one sliding flange or at least one fixed flange.

3. The telescopic reel according to claim 2, wherein the said central module of the reel comprises said drive means, which can receive motion, or drive force, through motion transmission means connected thereto and connected to a motor.

4. The telescopic reel according to claim 2, wherein said drive means are fastened to a telescopic central shaft of the reel.

5. The telescopic reel according to claim 2, wherein said drive means comprise at least one element selected from the group consisting of: at least one toothed wheel, one disk, one gear, one pulley.

6. The telescopic reel according to claim 2, wherein said at least one sliding flanges can slide along said at least one second crosspieces of said at least one side modules and on a central shaft of the reel during both the opening and closing phases of the reel.

7. The telescopic reel according to claim 6, wherein said at least one sliding flanges comprises a plurality of sliding flanges that are spaced substantially equidistant in a space comprised between said central module and outer ends of said at least one side module.

8. The telescopic reel according to claim 2, wherein said at least one fixed flange is secured to an outer end of said at least one side module.

9. The telescopic reel according to claim 1, wherein each said lifting means comprise a tooth holder and a tooth.

10. The telescopic reel according to claim 1, wherein each said lifting means comprise a single body equipped with a tooth and a hole through which said at least one first crosspiece and/or said at least one second crosspiece extends.

11. The telescopic reel according to claim 1, further comprising fastening means for securing each of said connectors to said lifting means, said fastening means comprising at least one element selected from a group consisting of: bolts, screws, eyelet of said tooth holder, and glueing material.

12. The telescopic reel according to claim 1, wherein each said connector comprises at least one element selected from a group consisting of: a cable of flexible material, a metal cable, a steel cable, a string, a rope, an eyelet of rigid material, an eyelet of flexible material, a chain, and a rubber belt.

13. The telescopic reel according to claim 1, further comprising a telescopic supporting frame coupled to at least one supporting fork, said support fork being configured for connecting the reel to an agricultural machine.

14. The telescopic reel according to claim 13, wherein said at least one side module comprises a pair of side modules positioned on opposite sides with respect to said central module.

15. A agricultural machine comprising a telescopic reel according to claim 1.

16. The telescopic reel according to claim 14, wherein said pair of side modules comprises a first side module associated with a first telescopic element located at a first end of said telescopic supporting frame, and a second side module associated with a second telescopic element located at a second end of said telescopic supporting frame.

17. The telescopic reel according to claim 9, wherein said tooth comprises a spring-loaded tooth, coupling means for coupling said tooth to said tooth holder, and at least one hole through which said at least on first crosspiece or said at least one second crosspiece extends.

18. A telescopic reel for an agricultural machine, comprising:
a central module having a first end and an opposing second end, said central module comprising a first crosspiece being fixed;
a first side module disposed at said first end of said central module and comprising a second crosspiece, said second crosspiece being telescopically coupled to said first crosspiece by said second crosspiece being slidably received within a cavity of said first crosspiece;
a first tooth holder and a spaced apart second tooth holder slidably mounted on said second crosspiece so that said first tooth holder and said second tooth holder are slidable along a length of said second crosspiece when said second crosspiece is advanced into said cavity of said first crosspiece;
an elongated first crop lifting tooth projecting from said first tooth holder;
an elongated second crop lifting tooth projecting from said second tooth holder; and
a first connector extending between and being coupled to said first tooth holder and said second tooth holder.

19. The telescopic reel as recited in claim 18, further comprising a second connector extending between and being connected to said first tooth holder and an intersection element, said intersection element comprising drive means, at least one sliding flange, or at least one fixed flange.

20. The telescopic reel as recited in claim 18, further comprising:
a second side module disposed at said second end of said central module and comprising a third crosspiece, said third crosspiece being telescopically coupled to said first crosspiece by said third crosspiece being slidably received within said cavity of said first crosspiece,
a third tooth holder and a spaced apart fourth tooth holder slidably mounted on said third crosspiece so that said third tooth holder and said fourth tooth holder are slidable along a length of said third crosspiece;
an elongated third crop lifting tooth projecting from said third tooth holder;
an elongated fourth crop lifting tooth projecting from said second tooth holder; and
a third connector extending between and being coupled to said third tooth holder and said fourth tooth holder.

* * * * *